J. D. SOWER.
VEHICLE TIRE.
APPLICATION FILED MAY 22, 1907.
907,191.
Patented Dec. 22, 1908.
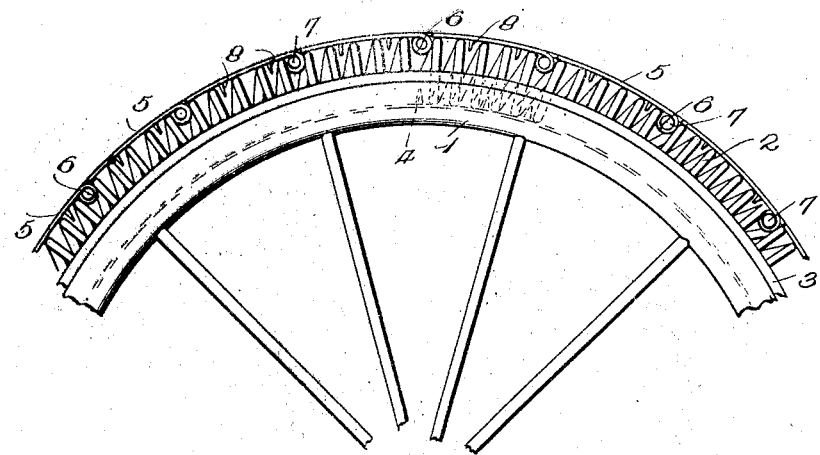
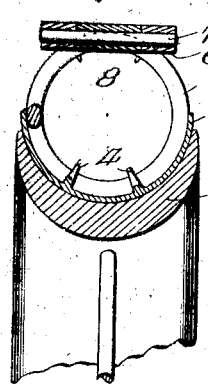
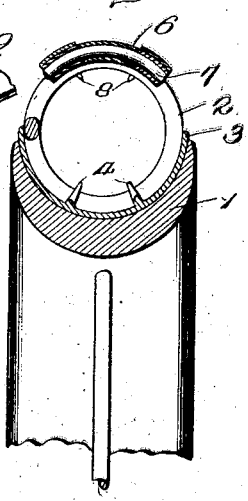
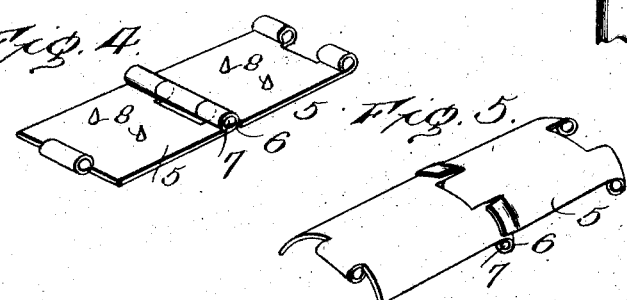
Inventor
Jacob D. Sower

UNITED STATES PATENT OFFICE.

JACOB D. SOWER, OF ELMO, KANSAS.

VEHICLE-TIRE.

No. 907,191.  Specification of Letters Patent.  Patented Dec. 22, 1908.

Application filed May 22, 1907. Serial No. 375,060.

*To all whom it may concern:*

Be it known that I, JACOB D. SOWER, citizen of the United States, residing at Elmo, in the county of Dickinson and State of Kansas, have invented certain new and useful Improvements in Vehicle-Tires, of which the following is a specification.

This invention relates to tires of the type embodying a yielding portion consisting essentially of a coil spring which is fitted to the rim of the wheel, the purpose of the present invention being to provide the tread portion of said coil spring with an armor or protector to sustain and distribute the stress and to prevent mud, stones and other foreign matter from entering the spaces formed between the volutes of the said spring coil to the detriment of the tire as well as increase the weight by accumulation.

The present invention provides a protector of novel formation which comprises a series of sections hinged or pivotally connected after the fashion of band or sprocket drive chains.

For a full understanding of the invention of the merits thereof and also to acquire a knowledge of the details of construction of the means for effecting the results, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which:

Figure 1 is a side view of a portion of a vehicle wheel provided with a tire constructed in accordance with and embodying the invention. Fig. 2 is a cross section of the tire and rim portion of the wheel showing the protector of straight formation. Fig. 3 is a view similar to Fig. 2 showing a curved formation. Fig. 4 is a perspective view of the form of protector shown in Fig. 2. Fig. 5 is a perspective view of the form of protector illustrated in Fig. 3. Fig. 6 is a view in perspective of the protector showing both bars and projections applied to the outer side thereof.

Corresponding and like parts are referred to in the following description and indicated in all the views of the drawings by the same reference characters.

Referring to the drawing the numeral 1 indicates the rim of the vehicle wheel and 2 the tire consisting of a coil spring fitted to the rim. The rim may be of metal or wood and have any cross sectional outline. The tire 2 may be continuous or any formation and may be constructed of any gage wire and is seated in the rim 1 which is channeled in its outer side to form a seat in which the tire is fitted. In some instances a channel iron 3 is interposed between the tire 2 and rim 1, the purpose being to retain the tire against lateral displacement. To prevent circumferential movement, or creeping of the tire upon the rim, pins 4 are provided and are set either into the rim 1 or channel iron 3 and project outward so as to engage with the coil of the tire and retain the same in adjusted position. The pins 4 may be of any construction and secured to the rim in any manner so long as they serve to prevent movement of the tire upon the rim.

The protector or guard is preferably constructed of sheet metal and is composed of sections which are pivoted or hinged, and said protector may be straight in transverse section, as shown in Fig. 2, or may be curved, as illustrated in Fig. 3. The manner of connecting the sections 5 is immaterial so long as the joint is sufficiently closed to prevent the passage of mud or foreign material. The hinge joint 6 projects inward and is adapted to come between adjacent coils, thereby assisting materially in preventing movement of the protector upon the tire as well as leaving the outside of the protector smooth which is desirable in certain instances. The end of the adjacent sections are extended and formed into eyes which are adapted to receive a connecting pin 7. The pins together with the eyes form inner projections which come between adjacent coils and prevent movement of the protector upon the tire. It is also contemplated to provide pins 8 which are fitted to the inner side of the protector to project inward and engage with coils of the tire. The pins 8 constitute projections, or stops, and may be of any construction and secured to the protector in any manner.

When the protector is applied to the drive wheel and in order to insure traction and prevent slipping of the wheel upon the ground it is proposed to supply the outer side of the protector with projections to penetrate the surface of the road and make positive engagement therewith to attain the desired end. These outer projections may be pins 9 and bars 10. This is shown most clearly in Fig. 6. When the protector is fitted to the tire a space is formed between the edges of the protector and the edges of the rim, thereby preventing interference one with the other as the tire is compressed when sustaining the load.

Having thus described the invention, what is claimed as new is:

In a vehicle wheel, the combination of a rim, a channel iron fitted to said rim and having outer projections, a spring coil seated in the channel iron and forming a tire and having the projections of said channel iron coming between elements of said spring coil, a protector fitted to the outer portion of the spring coil and composed of sections hingedly connected and having the hinge joints projected inward to come between elements of said spring coil, said protector having inner projections also coming between elements of the spring coil, and projections and bars extended outward from the protector to prevent slipping.

In testimony whereof I affix my signature in presence of two witnesses.

JACOB D. SOWER. [L. S.]

Witnesses:
A. S. PERCY,
EDW. J. LORSON.